(12) United States Patent
Wagner, Sr.

(10) Patent No.: US 10,759,357 B2
(45) Date of Patent: Sep. 1, 2020

(54) SERVICE TRAILER

(71) Applicant: Rapid Deployment, Inc., Mobile, AL (US)

(72) Inventor: Bruce R. Wagner, Sr., Mobile, AL (US)

(73) Assignee: Rapid Deployment, Inc., Mobile, AL (US)

( * ) Notice: Subject to any disclaimer, the term of this patent is extended or adjusted under 35 U.S.C. 154(b) by 0 days.

(21) Appl. No.: 16/007,610

(22) Filed: Jun. 13, 2018

(65) Prior Publication Data

US 2018/0361953 A1 Dec. 20, 2018

Related U.S. Application Data

(60) Provisional application No. 62/519,407, filed on Jun. 14, 2017.

(51) Int. Cl.
| | |
|---|---|
| *B60R 15/00* | (2006.01) |
| *B60Q 1/24* | (2006.01) |
| *B60P 3/22* | (2006.01) |
| *B60P 3/18* | (2006.01) |

(52) U.S. Cl.
CPC ............... *B60R 15/00* (2013.01); *B60P 3/18* (2013.01); *B60P 3/22* (2013.01); *B60P 3/2225* (2013.01); *B60Q 1/24* (2013.01); *Y10T 137/6855* (2015.04)

(58) Field of Classification Search
CPC ..... B60R 15/00; B60P 3/225; Y10T 137/6855
USPC ................................................ 280/830–839
See application file for complete search history.

(56) References Cited

U.S. PATENT DOCUMENTS

| | | | | |
|---|---|---|---|---|
| 3,705,743 | A * | 12/1972 | Toomey | B60P 3/36 296/168 |
| 3,799,244 | A * | 3/1974 | Strauss | B60P 3/14 165/42 |
| 4,454,613 | A * | 6/1984 | Palmer | B60R 15/00 296/171 |
| 5,240,043 | A * | 8/1993 | Campbell | B67D 7/002 137/211 |
| 5,893,341 | A * | 4/1999 | Cox | E04H 4/129 122/DIG. 10 |
| 6,029,707 | A * | 2/2000 | Couch | B60R 15/00 137/565.37 |
| 6,349,733 | B1 * | 2/2002 | Smith | E03B 7/07 137/1 |
| 6,352,086 | B1 * | 3/2002 | Harper | B60R 15/00 137/384.2 |
| 6,352,088 | B1 * | 3/2002 | Stegall | B60R 15/00 137/899 |
| 6,629,542 | B2 * | 10/2003 | Carris | C02F 1/004 137/1 |
| 7,192,060 | B2 * | 3/2007 | Warrick | B60P 3/22 280/831 |
| 7,806,463 | B2 * | 10/2010 | Oliver | B60R 15/00 296/168 |
| 8,740,251 | B2 * | 6/2014 | Batson | B64F 1/28 137/355.16 |
| 8,950,427 | B2 * | 2/2015 | Gallo | B60R 15/00 137/259 |
| 9,464,968 | B2 * | 10/2016 | Firstenberg | G01N 1/14 |

(Continued)

*Primary Examiner* — Kevin F Murphy
(74) *Attorney, Agent, or Firm* — Breiner & Breiner, L.L.C.

(57) ABSTRACT

There is disclosed a service trailer which may be quickly deployed to a site to provide potable water, electricity, lighting and a storage of grey water.

17 Claims, 6 Drawing Sheets

(56) References Cited

U.S. PATENT DOCUMENTS

2011/0113545 A1* 5/2011 Driessen .................. B60R 9/06
4/476

* cited by examiner

SERVICE TRAILER

RELATED APPLICATION

This application claims benefit of U.S. Provisional Application Ser. No. 62/519,407, filed Jun. 14, 2017, entitled "Service Trailer," which application is incorporated herein by reference in its entirety.

FIELD OF THE INVENTION

The present invention relates to a service trailer. More particularly, the present invention relates to a service trailer which may be quickly deployed to a site to provide potable water, electricity, lighting and a storage of grey water.

BACKGROUND OF THE INVENTION

Various sites require the use of potable water, electricity and lighting. Such sites may require such items in an emergency situation for use during a short period of time or for a semi-permanent use. Such sites may include natural disaster sites such as flooding and hurricanes or manmade disasters; or for other situations such as tent cities or social events such as concerts or boat shows; or at other sites generally in need of such items.

As a further example, such items may be required for portable restrooms, portable showers or similar uses.

There are no known service trailers on the market providing the benefits of the present invention.

SUMMARY OF THE INVENTION

A primary object of the present invention is to provide a service trailer capable of providing water, electricity, lighting and storage of grey water.

Another primary object of the present invention is to provide a full service trailer unit ("FSTU") which is transportable.

Another primary object of the present invention is to provide FSTUs which can provide temporary or semi-permanent provisions.

Another primary object of the present invention is to provide FSTUs which supply electricity to one, two or three modular shower units with one to sixteen showerheads.

Another primary object of the present invention is to provide FSTUs which provide pole lights for lighting, including for work and security.

Another primary object of the present invention is to provide FSTUs which provide additional power in 50 amp, 30 amp, and 115 volt configurations for auxiliary use.

Another primary object of the present invention is to provide FSTUs which utilize quick-lock hose connections for rapid response and standardization with potable water tanks and sewage collection trucks and tankers.

Another primary object of the present invention is to provide FSTUs which provide flexible drinking water hoses with quick-lock connections.

Another primary object of the present invention is to provide FSTUs which provide flexible grey water hoses with quick-lock connections for a grey water tank.

Another primary object of the present invention is to provide FSTUs which include a macerator pump to convey grey water from any modular shower/restroom/kitchen/laundry unit to the FSTU.

Another primary object of the present invention is to provide a large capacity potable drinking water tank and a waste water collection tank where each tank has a quick-lock connection for supply and drain lines with cutoff valves.

Another primary object of the present invention includes FSTUs which provide potable water distribution and a pressurization pump.

The present invention is directed to a service trailer comprising a trailer having a fresh water tank, a grey water tank, a generator for generating electricity, and lighting.

The present invention is further directed to a self-contained transportable service trailer comprising a trailer having attached thereto a fresh water tank having a means to fill the tank and a means to deliver water from the fresh water tank to an environment of use; a grey water tank having a means to remove grey water from an environment of use and transport the grey water to the grey water tank and a means to expel the grey water from the tank; a generator for generating electricity, including for trailer components; and a lighting member comprising a pole light.

The present invention is further directed to a method of operating a mobile restroom system or a mobile shower system comprising supplying fresh water to such system, removing grey water from such system and supplying electricity to such system, all from a self-contained transportable service trailer comprising a trailer having attached thereto a fresh water tank having a means to fill the tank and a means to deliver water from the fresh water tank to the mobile restroom or shower system; a grey water tank having a means to remove grey water from the mobile restroom or shower system and transport the grey water to the grey water tank and a means to expel the grey water from the tank; a generator for generating electricity, including for trailer components; and a lighting member comprising a pole light.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Referring to the figures, there is disclosed a service trailer 10. Service trailer 10 may include trailer 12; fresh water tank 14; grey water tank 16; generator 18; light 20; pump 22; water hose and connector 24; pressurized accumulator tank with diaphragm 26; water outlet line 28; water outlet 30; grey water intake line 32; grey water intake pump 34; grey water macerator 36; and grey water outlet 38. Each of these components are shown in the drawings and will be discussed in further detail hereafter.

Figure 1:
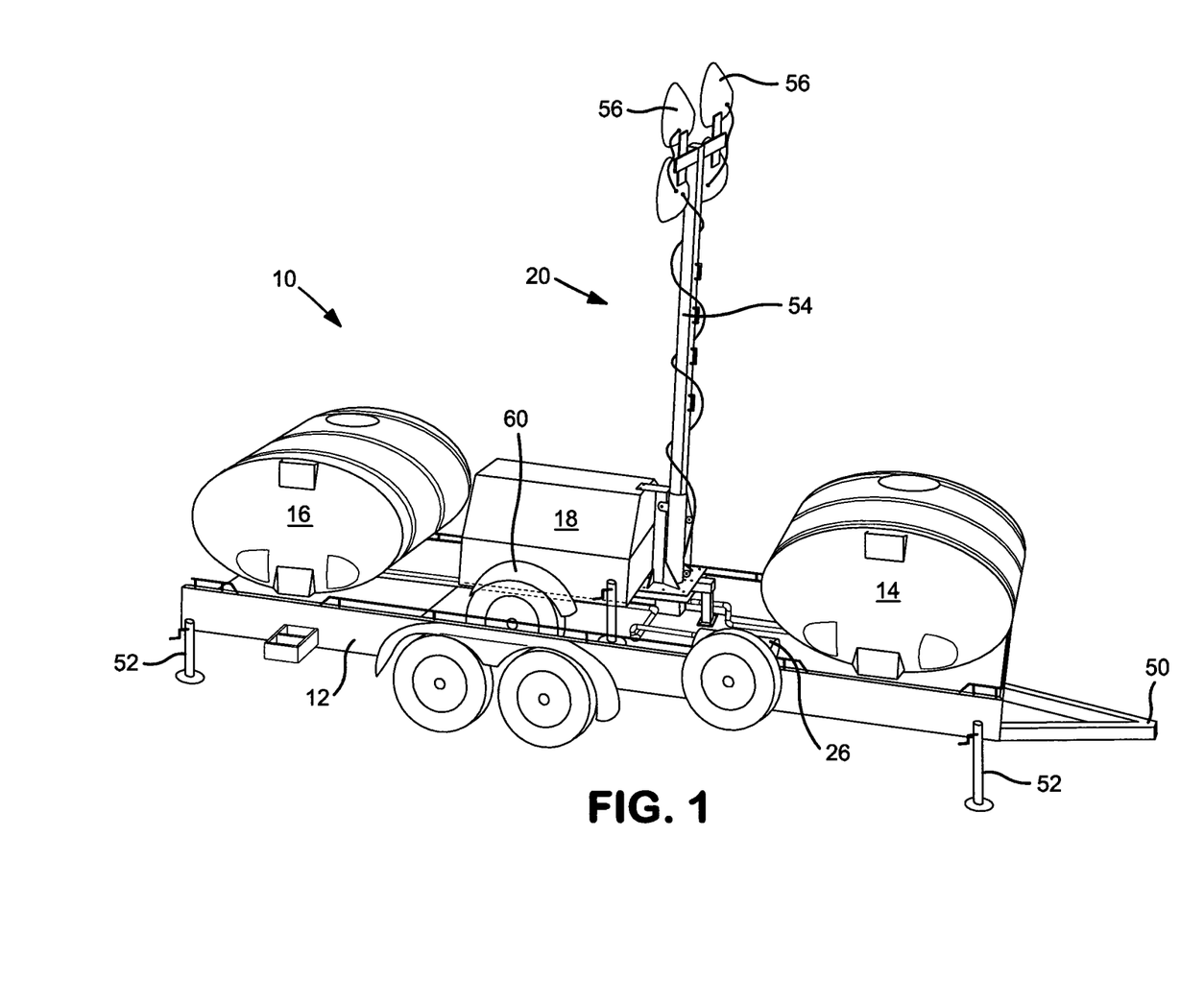
FIG. 1 is a perspective view of the service trailer of the present invention.
Figure 3:
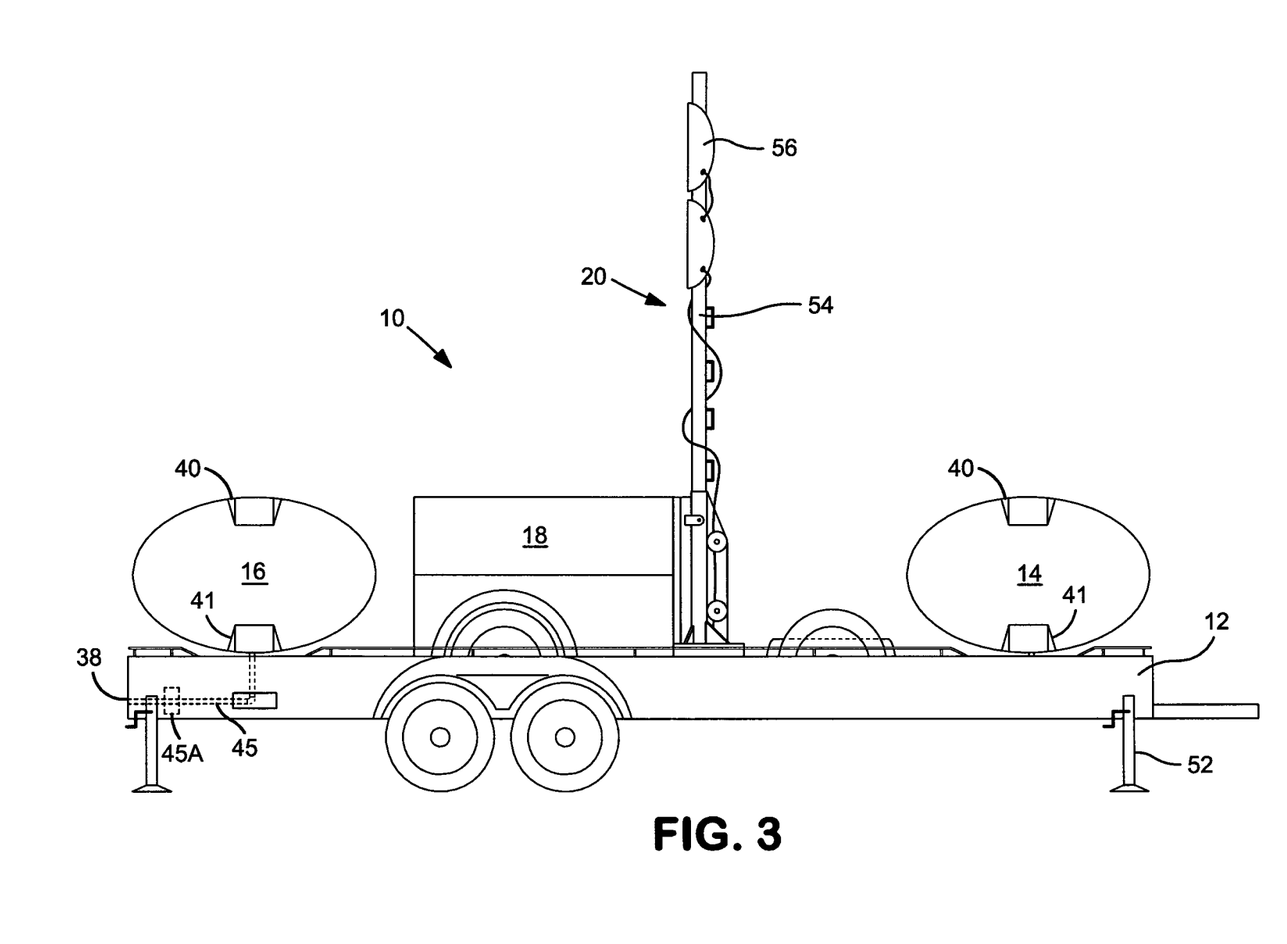
FIG. 3 is a side view of the service trailer of FIG. 1 showing in broken lines means for removing grey water for a grey water tank.
Figure 4:
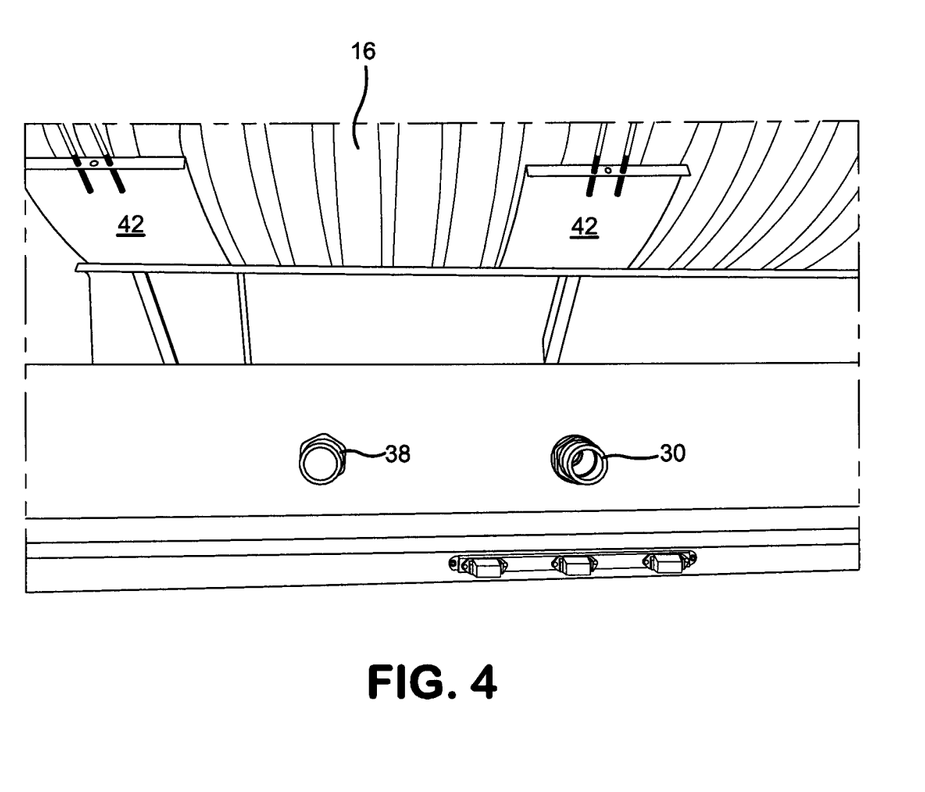
FIG. 4 is a rear view of the service trailer of FIG. 1 illustrating a fresh water outlet and a grey water outlet.

Trailer 12 may be a sixteen foot double axle department of transportation approved trailer. The trailer in a preferred embodiment is a flatbed trailer. The trailer includes a hitch 50 for mounting to a truck or other vehicle for pulling the trailer. Once to the site of use, the trailer is removed from the source of transportation. The trailer may include jack stands 52 which are rotatably held in a horizontal non-use position when the trailer is in transport and when in use rotated to a vertical position to stabilize the trailer as shown in FIGS. 1 and 3.

As seen in the drawing, the trailer 12 includes a fresh water tank 14, preferably a 750 gallon fresh water tank. It includes a fresh water intake hatch 40, as shown for example in FIGS. 2 and 3, for receiving fresh water and drainage port 41 at the bottom thereof. There is also a water removal port 43 as discussed below. Tank 14 is secured to the trailer by straps 42 or other means. There is also a similar grey water tank 16 having a hatch 40, also secured by straps 42, and having a drainage port 41.

There is a generator 18, preferably a diesel powered generator. A preferred generator is a Magnum generator and includes a pole light 20. As shown in the figures, generator 18 is transportable having a trailer 60 for movement on and off the service trailer 10, although it may be secured directly to the service trailer 10 without the trailer. More specifically, the generator 18 is a 25 KW GenSet having 120/240 volt single phase output and a "plug and play" power provision. The generator will provide power to the equipment on the trailer and to the environment of use, e.g. mobile restroom systems or mobile shower systems.

Figure 2:
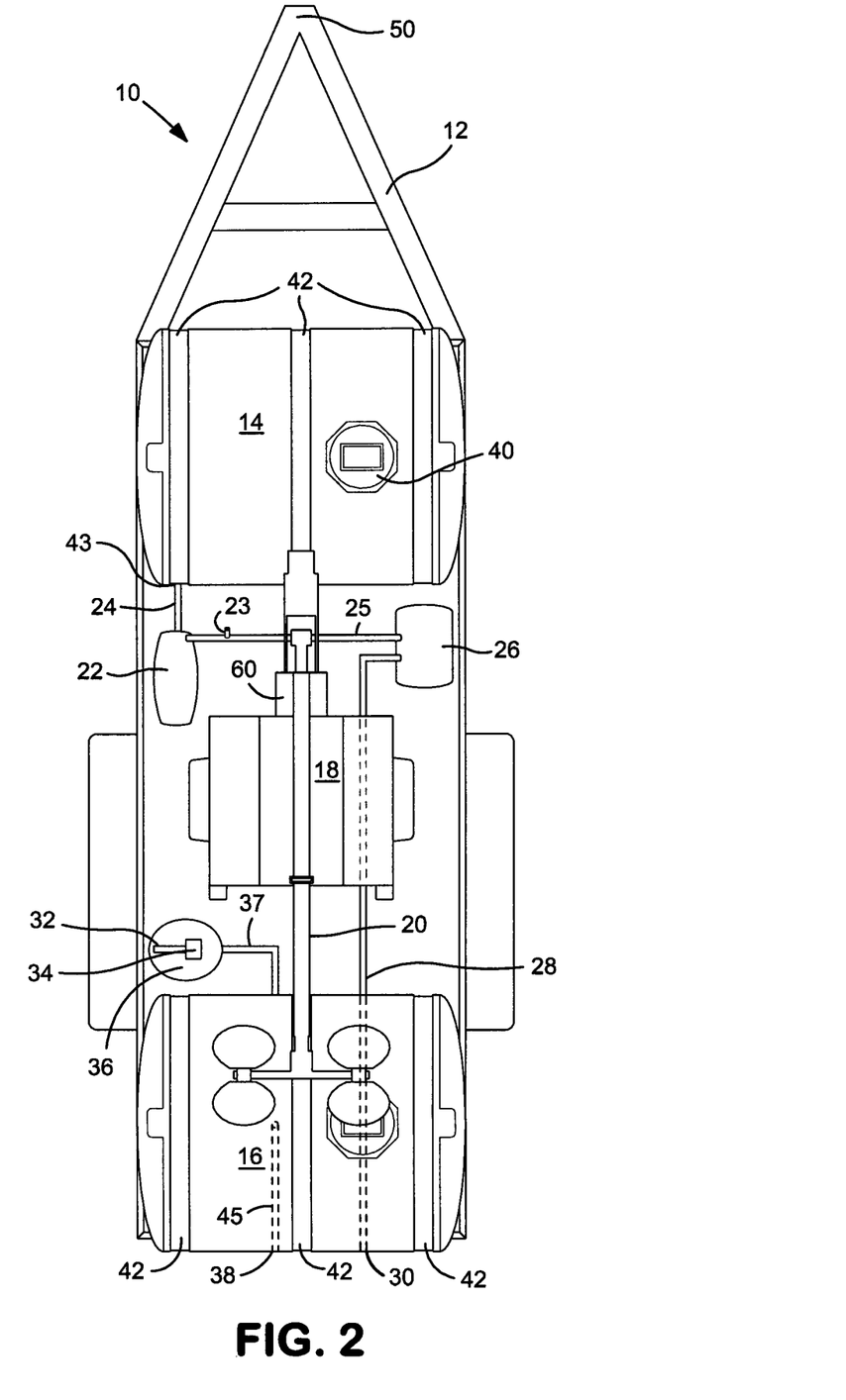
FIG. 2 is a top plan view of the service trailer of FIG. 1 illustrating various components of the invention, including a fresh water tank, fresh water tank lines, a fresh water tank pump, a fresh water tank pressurized accumulator tank with diaphragm, a generator, a pole light, a grey water tank and a grey water pump and macerator.

The light 20 provides light for a work area and/or for security. The light 20 pivots from a transport position as shown in FIG. 2 to a use position as shown in FIGS. 1 and 3 and includes a mast 54 and multiple lights 56, which in a preferred embodiment are metal halide lights preferably providing 440,000 lumens.

Figure 5:
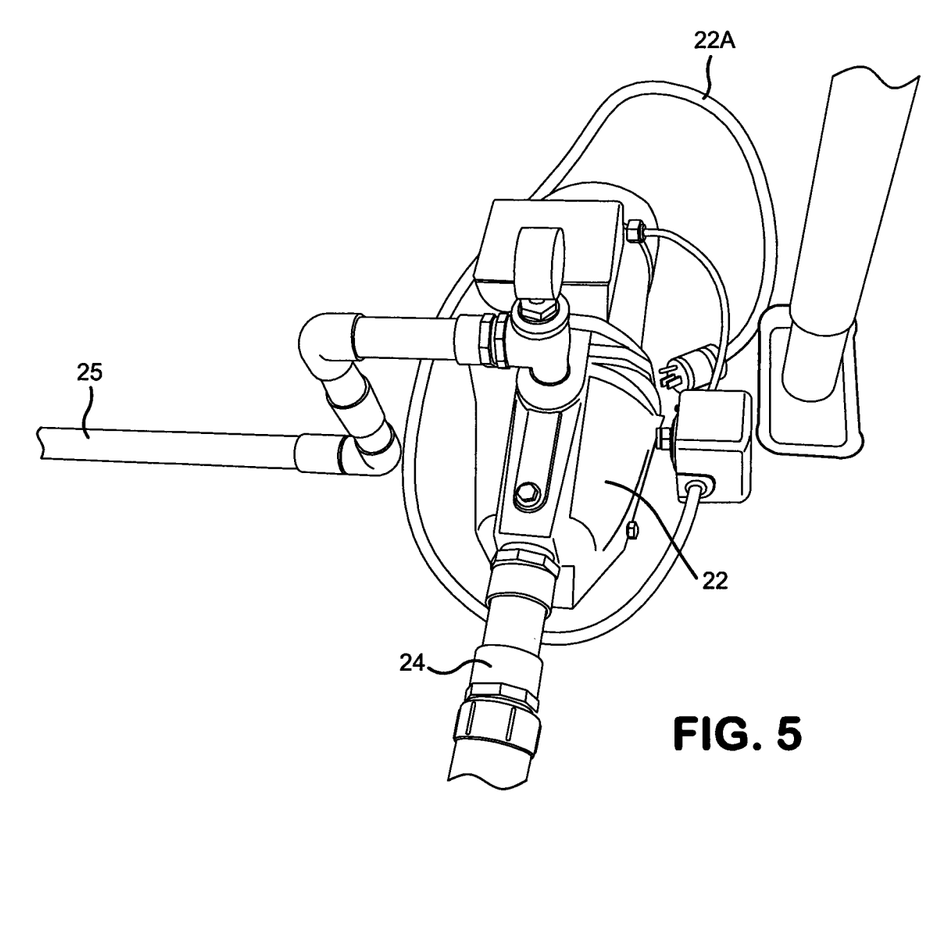
FIG. 5 is a view showing the fresh water pump and the water connection lines.

The fresh water tank water removal port 43 is connected by a water hose/pipe and connector 24 to a pump 22. It is understood the terms hose and pipe used herein are interchangeable and the hose/pipe may be flexible or inflexible. A preferred pump is a Utilitech 0.5 horsepower shallow well jet pump having cord 22A which is powered by generator 18. Pump 22 is connected by piping 25 to a pressurized accumulator tank with diaphragm 26 which tank is connected to a water outlet line 28 and the fresh water exits the service trailer through water outlet 30 by any suitable means such as a quick-lock connector and hose to connect to the end use facility, e.g. a mobile restroom system or a mobile shower system.

Service trailer 10 includes grey water tank 16 as discussed above. After the water is used, e.g. in a restroom facility or a shower facility, the grey water is removed from the facility to the service trailer by suitable hoses with quick-lock connectors at intake line 32 by an intake pump 34. The grey water is sent to a macerator 36 and the grey water is then removed by suitable hoses or piping 37 to grey water tank 16. The grey water is released through drainage port 41 by a suitable hose or piping 45 with a cut-off valve 45A to a grey water outlet 38. Preferably, a quick-lock connector and hose is connected to outlet 38 to remove the grey water to a sewage collection truck or tanker.

The service trailer 10 may be used to provide a self-contained, integrated Mobile Restroom System. The system stores fresh water, generates power, provides security lighting and manages grey water. The components of the service trailer 10 may be used independently, together or joined with other units to offer flexibility in a variety of deployment mission requirements. As an example, the Mobile Restroom System may generally comprise three components, namely, (1) a mobile restroom unit comprising six toilets (enclosed stall, with door), six faucets sinks and mirrors and 110 v AC electrical outlets (not shown); (2) a pressurized potable and grey water management system comprising a 750 gallon fresh water tank 14 and a 750 gallon grey water tank 16; (3) a power generator 18 with a portable light tower unit 20 comprising a 25 KW GenSet; a 120/240 volt single phase output; a plug and play power provision; light coverage covering 5 to 7 acres; and 440,000 lumens of light provided by metal halide lights.

The service trailer 10 may also be used to provide a self-contained, integrated Mobile Shower System. The system stores fresh water, generates power, provides security lighting and manages grey water. The components of the service trailer 10 may be used independently, together or joined with other units to offer flexibility in a variety of deployment mission requirements. As an example, the Mobile Shower System may generally comprise three components, namely, (1) a mobile shower unit comprising six shower heads, six faucets, sinks and mirrors and 110 v AC electrical outlets (not shown); (2) a pressurized potable and grey water management system comprising a 750 gallon fresh water tank 14 and a 750 gallon grey water tank 16; (3) a power generator 18 and a portable light tower unit 20 comprising a 25 KW GenSet; a 120/240 volt single phase output; a plug and play power provision; light coverage covering 5 to 7 acres; and 440,000 lumens of light provided by metal halide lights.

The service trailer 10 is, therefore, designed to incorporate all disciplines and equipment needed to operate multiple ablution modules and or units simultaneously without the need for added space requirements, multiple licensed personnel and associated logistics, unloading, and time consuming set-ups. The service trailer 10 is ready to operate upon arrival. Its "plug and play" layout provides for immediate service anywhere that power generation, potable water storage and distribution, waste water maceration and storage and removal, and security lighting are needed. The service trailer 10 is built to enable multiple services through one compact transportable unit.

Figure 6:
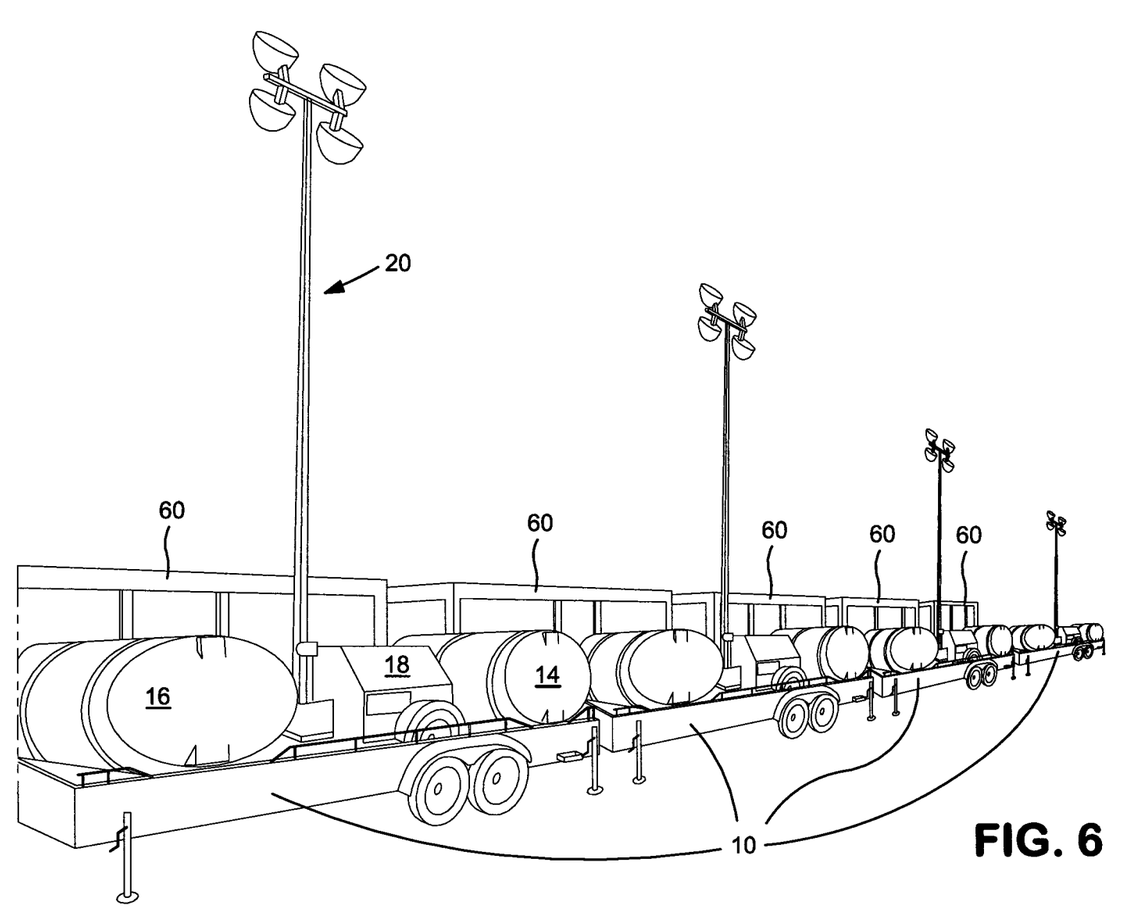
FIG. 6 illustrates a number of the service trailers of the present invention used to run a plurality of modular shower units and/or restroom units.

Referring to FIG. 6, there is shown a plurality of the service trailers 10 in use to run a plurality of modular shower units and/or restroom units 60.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A self-contained transportable service trailer comprising a trailer having attached thereto a fresh water tank having a means to fill said tank and a means to deliver water from said fresh water tank to an environment of use remote from said trailer, a grey water tank having a means to remove grey water from said environment of use remote from said trailer and transport said grey water to said grey water tank and a means to expel said grey water from said tank, wherein said fresh water tank and said grey water tank are of substantially similar volume such that the amount of fresh water delivered from said fresh water tank to said environment of use may be received by said grey water tank from said environment of use, a generator for generating electricity, including for trailer components and for components in said environment of use remote from said trailer, and a lighting member comprising a pole light having multiple lights for providing light to at least five acres of said environment of use remote from said trailer.

2. The self-contained transportable service trailer of claim 1 wherein said means to deliver water from said fresh water tank to said environment of use remote from said trailer further comprises a pump and a pressurized accumulator tank.

3. The self-contained transportable service trailer of claim 2 wherein said means to remove grey water from said environment of use remote from said trailer and transport said grey water to said grey water tank comprises a pump and a macerator.

4. The self-contained transportable service trailer of claim 3 wherein said means to deliver water from said fresh water tank comprises piping connected to said pressurized accumulator tank and extending to a water outlet in said trailer and a quick-lock connector and hose connected to said environment of use remote from said trailer.

5. The self-contained transportable service trailer of claim 4 wherein said means to expel said grey water from said grey water tank comprises a hose connected to said tank and extending to a grey water outlet in said trailer.

6. The self-contained transportable service trailer of claim 1 wherein said means to remove grey water from said environment of use remote from said trailer and transport said grey water to said grey water tank comprises a pump and a macerator.

7. The self-contained transportable service trailer of claim 1 wherein said environment of use remote from said trailer is selected from the group consisting of a mobile restroom system and a mobile shower system.

8. The self-contained transportable service trailer of claim 1 wherein said trailer is a sixteen foot double axle trailer.

9. The self-contained transportable service trailer of claim 1 wherein said fresh water tank and said grey water tank hold 750 gallons or more.

10. A method of operating a mobile restroom system or a mobile shower system comprising supplying fresh water to such system and removing grey water from such system and supplying electricity to such system from a service trailer remote from said mobile restroom or shower system comprising a self-contained transportable service trailer comprising a trailer having attached thereto a fresh water tank having a means to fill said tank and a means to deliver water from said fresh water tank to said mobile restroom or shower system; a grey water tank having a means to remove grey water from said mobile restroom or shower system and transport said grey water to said grey water tank and a means to expel said grey water from said tank, wherein said fresh water tank and said grey water tank are of substantially similar volume such that the amount of fresh water delivered from said fresh water tank to said environment of use may be received by said grey water tank from said environment of use; a generator for generating electricity, including for trailer components and said mobile restroom or shower system; and a lighting member comprising a pole light having multiple lights for providing light to said mobile restroom or shower system.

11. The method according to claim 10 wherein said means to deliver water from said fresh water tank to said mobile restroom or shower system further comprises a pump and a pressurized accumulator tank.

12. The method according to claim 11 wherein said means to remove grey water from said mobile restroom or shower system and transport said grey water to said grey water tank comprises a pump and a macerator.

13. The method according to claim 12 wherein said means to deliver water from said fresh water tank comprises piping connected to said pressurized accumulator tank and extending to a water outlet in said trailer and a quick-lock connector and hose connected to said mobile restroom or shower system.

14. The method according to claim 13 wherein said means to expel said grey water from said grey water tank comprises a hose connected to said tank and extending to a grey water outlet in said trailer.

15. The method according to claim 10 wherein said means to remove grey water from said mobile restroom or shower system and transport said grey water to said grey water tank comprises a pump and a macerator.

16. The method according to claim 10 wherein said trailer is a sixteen foot double axle trailer.

17. The method according to claim 10 wherein said fresh water tank and said grey water tank hold 750 gallons or more.

* * * * *